United States Patent
Poe

(10) Patent No.: US 8,560,557 B1
(45) Date of Patent: Oct. 15, 2013

(54) METHOD AND SYSTEM OF PROGRESS MONITORING

(71) Applicant: Corrisoft, LLC, Lexington, KY (US)

(72) Inventor: Brian C. Poe, Lexington, KY (US)

(73) Assignee: Corrisoft, LLC, Lexington, KY (US)

( * ) Notice: Subject to any disclaimer, the term of this patent is extended or adjusted under 35 U.S.C. 154(b) by 0 days.

(21) Appl. No.: 13/715,489

(22) Filed: Dec. 14, 2012

Related U.S. Application Data

(60) Provisional application No. 61/570,493, filed on Dec. 14, 2011.

(51) Int. Cl.
*G06F 17/30* (2006.01)

(52) U.S. Cl.
USPC .......................................................... 707/754

(58) Field of Classification Search
USPC ................................................ 707/754, 758
See application file for complete search history.

(56) References Cited

U.S. PATENT DOCUMENTS

| | | |
|---|---|---|
| 5,043,736 A | 8/1991 | Darnell et al. |
| 5,266,944 A | 11/1993 | Carroll et al. |
| 5,298,884 A | 3/1994 | Gilmore et al. |
| 5,369,699 A | 11/1994 | Page et al. |
| 5,396,227 A | 3/1995 | Carroll et al. |
| 5,461,390 A | 10/1995 | Hoshen |
| 5,537,102 A | 7/1996 | Pinnow |
| 5,661,458 A | 8/1997 | Page et al. |
| 5,731,757 A | 3/1998 | Layson, Jr. |
| 5,867,103 A | 2/1999 | Taylor, Jr. |
| 5,892,447 A | 4/1999 | Wilkenson |
| 5,959,533 A | 9/1999 | Layson, Jr. |
| 5,982,281 A | 11/1999 | Layson, Jr. |
| 6,014,080 A | 1/2000 | Layson, Jr. |
| 6,044,257 A | 3/2000 | Boling et al. |
| 6,054,928 A * | 4/2000 | Lemelson et al. ......... 340/573.4 |
| 6,072,396 A | 6/2000 | Gaukel |
| 6,100,806 A | 8/2000 | Gaukel |
| 6,130,620 A | 10/2000 | Pinnow et al. |
| 6,160,481 A | 12/2000 | Taylor, Jr. |
| D440,954 S | 4/2001 | Boling et al. |
| 6,226,510 B1 | 5/2001 | Boling et al. |
| 6,285,867 B1 | 9/2001 | Boling et al. |
| 6,337,665 B1 | 1/2002 | Gaukel |
| 6,366,538 B1 | 4/2002 | Anderson et al. |
| 6,405,213 B1 * | 6/2002 | Layson et al. ................. 707/758 |
| 6,437,696 B1 * | 8/2002 | Lemelson et al. ......... 340/573.4 |
| 6,470,319 B1 * | 10/2002 | Ryan ............................. 705/325 |
| 6,606,304 B1 | 8/2003 | Grinter et al. |
| 6,636,732 B1 | 10/2003 | Boling et al. |

(Continued)

OTHER PUBLICATIONS

Screenshot, 3M Electronic Monitoring, Domestic Violence Proximity Notification System, 2011. Accessed May 22, 2013 http://solutions.3m.com/3MContentRetrievalAPI/BlobServlet?lmd=1316545433000&locale=en_WW&assetType=MMM_Image&assetId=1273695271401&blobAttribute=ImageFile.

(Continued)

*Primary Examiner* — Sheree Brown
(74) *Attorney, Agent, or Firm* — Frost Brown Todd LLC

(57) ABSTRACT

It is possible to enable the secure, efficient, and synchronized transmittal of data between users, eliminate the need for a body-worn transmitting device, and provide access to a variety of resources. In some embodiments, access is provided to real-time status updates and opportunities offered by service providers. Multiple embodiments are capable of executing tools and techniques that promote the reentry of participants into society while reducing costs to legislatures and prioritizing public good.

5 Claims, 5 Drawing Sheets

(56) References Cited

U.S. PATENT DOCUMENTS

| | | | |
|---|---|---|---|
| 6,639,516 B1 | 10/2003 | Copley | |
| 6,646,617 B1 | 11/2003 | Gaukel | |
| 6,674,368 B2 * | 1/2004 | Hawkins et al. | 340/573.4 |
| 6,703,936 B2 | 3/2004 | Hill et al. | |
| 6,774,797 B2 | 8/2004 | Freathy et al. | |
| 6,774,799 B2 | 8/2004 | Defant et al. | |
| 6,844,816 B1 | 1/2005 | Melton et al. | |
| 6,853,304 B2 | 2/2005 | Reisman et al. | |
| 6,972,684 B2 | 12/2005 | Copley | |
| 6,992,581 B2 | 1/2006 | Reisman et al. | |
| 6,992,582 B2 | 1/2006 | Hill et al. | |
| 6,998,985 B2 | 2/2006 | Reisman et al. | |
| 7,015,817 B2 | 3/2006 | Copley et al. | |
| 7,064,670 B2 | 6/2006 | Galperin et al. | |
| 7,092,695 B1 | 8/2006 | Boling et al. | |
| 7,098,795 B2 | 8/2006 | Adamczyk et al. | |
| 7,119,695 B2 | 10/2006 | Defant et al. | |
| 7,123,141 B2 | 10/2006 | Contestabile | |
| 7,205,890 B2 | 4/2007 | Defant et al. | |
| 7,251,471 B2 | 7/2007 | Boling et al. | |
| RE39,909 E | 11/2007 | Taylor, Jr. | |
| 7,317,377 B2 | 1/2008 | Galperin et al. | |
| 7,330,122 B2 | 2/2008 | Derrick et al. | |
| 7,382,268 B2 | 6/2008 | Hartman | |
| 7,420,878 B2 * | 9/2008 | Holmes et al. | 367/128 |
| D578,918 S | 10/2008 | Aninye | |
| 7,446,656 B2 | 11/2008 | Blakeway | |
| 7,456,355 B2 | 11/2008 | Blakeway | |
| 7,489,249 B2 | 2/2009 | Better et al. | |
| 7,518,500 B2 | 4/2009 | Aninye et al. | |
| 7,522,060 B1 * | 4/2009 | Tumperi et al. | 340/573.4 |
| 7,545,318 B2 | 6/2009 | Derrick et al. | |
| 7,619,513 B2 | 11/2009 | Hill et al. | |
| 7,636,047 B1 | 12/2009 | Sempek | |
| 7,701,171 B2 | 4/2010 | Defant et al. | |
| 7,719,426 B2 * | 5/2010 | Sloan | 340/573.1 |
| 7,737,841 B2 | 6/2010 | Derrick et al. | |
| 7,751,282 B2 * | 7/2010 | Holmes et al. | 367/128 |
| 7,804,412 B2 | 9/2010 | Derrick et al. | |
| 7,860,222 B1 * | 12/2010 | Sidler et al. | 379/32.01 |
| 7,864,047 B2 | 1/2011 | Aninye et al. | |
| 7,864,050 B1 * | 1/2011 | Eslambolchi et al. | 340/572.1 |
| 7,889,847 B2 * | 2/2011 | Gainsboro | 379/88.02 |
| 7,930,927 B2 | 4/2011 | Cooper et al. | |
| 7,936,262 B2 | 5/2011 | Derrick et al. | |
| 7,961,092 B2 | 6/2011 | Freathy et al. | |
| 7,984,540 B2 | 7/2011 | Blakeway | |
| 8,009,036 B2 | 8/2011 | Freathy et al. | |
| 8,013,736 B2 | 9/2011 | Derrick et al. | |
| 8,031,077 B2 | 10/2011 | Derrick et al. | |
| 8,098,804 B1 * | 1/2012 | Rae et al. | 379/142.05 |
| 8,232,876 B2 | 7/2012 | Derrick et al. | |
| 8,275,096 B2 * | 9/2012 | Neece | 379/38 |
| 8,395,513 B2 | 3/2013 | Moran et al. | |
| 2002/0067272 A1 * | 6/2002 | Lemelson et al. | 340/573.4 |
| 2004/0199462 A1 * | 10/2004 | Starrs | 705/39 |
| 2006/0149665 A1 * | 7/2006 | Weksler | 705/38 |
| 2007/0139207 A1 | 6/2007 | Agapi et al. | |
| 2007/0280462 A1 * | 12/2007 | Neece | 379/201.01 |
| 2008/0012760 A1 * | 1/2008 | Derrick et al. | 342/357.07 |
| 2008/0088438 A1 | 4/2008 | Aninye et al. | |
| 2008/0096521 A1 | 4/2008 | Boling et al. | |
| 2008/0108370 A1 | 5/2008 | Aninye | |
| 2008/0122613 A1 * | 5/2008 | Sanger | 340/539.11 |
| 2008/0316022 A1 | 12/2008 | Buck et al. | |
| 2010/0066545 A1 | 3/2010 | Ghazarian | |
| 2010/0090825 A1 | 4/2010 | Freathy | |
| 2010/0090827 A1 | 4/2010 | Gehrke et al. | |
| 2010/0123589 A1 | 5/2010 | Buck et al. | |
| 2010/0240969 A1 | 9/2010 | Rompa et al. | |
| 2011/0133928 A1 | 6/2011 | Buck et al. | |
| 2011/0133937 A1 | 6/2011 | Buck et al. | |
| 2011/0195722 A1 | 8/2011 | Walter et al. | |
| 2011/0248853 A1 | 10/2011 | Roper et al. | |
| 2012/0056744 A1 | 3/2012 | Gemer | |
| 2012/0299722 A1 * | 11/2012 | Lee et al. | 340/539.12 |
| 2013/0006066 A1 | 1/2013 | Melton | |
| 2013/0024112 A1 * | 1/2013 | Tate, Jr. | 701/439 |

OTHER PUBLICATIONS

Screenshot, Oakland County Michigan, Community Corrections, Electronic Monitoring Devices, 2012. Accessed May 22, 2013 http://www.oakgov.com/commcorr/Pages/program_service/electronic_monitor.aspx.

Utterback's Utterings, Satellite Tracking of People LLC, Stalker Alert, Feb. 1, 2011. Accessed May 22, 2013 http://www.utterbacksutterings.com/category/domestic-violence/.

* cited by examiner

METHOD AND SYSTEM OF PROGRESS MONITORING

CROSS REFERENCE TO RELATED APPLICATIONS

This document is related to, and claims priority from, U.S. provisional patent application Ser. No. 61/570,493, filed on Dec. 14, 2011 with the same title and inventor as the present document. That application is hereby incorporated by reference in its entirety.

BACKGROUND

1. Field

The invention relates generally to electronic monitoring and supervision in the criminal justice field. More specifically, embodiments of the invention relate to systems and methods for computerized management of offenders being supervised by criminal justice agencies and their staff.

2. Related Art

The current system of corrections relies on outdated methods and technologies, causing it to be both costly and inefficient. Prisons are overcrowded and the national corrections budget for 2012 is in excess of $74 billion. Many corrections personnel such as parole and probation officers are overworked and have heavy caseloads that can keep them from dedicating the necessary attention to each case. Owing to these limited resources, it is becoming increasingly difficult for officers to manage caseloads while maintaining a high level of individual care and support.

House arrest programs and body-worn monitoring devices (e.g. ankle bracelets) are widely implemented as a means of reducing prison populations. However, in general practice, these devices and programs have several serious flaws—for example, body worn monitoring devices cannot transmit a signal out of range of their associated base units, and certain health risks are associated with prolonged wearing of such a device. Additionally, the individual under such supervision faces significant barriers to reintegrating into society, such as the visibility of a body-worn device, which can engender discrimination and limit the individual's ability to acquire a job, make meaningful connections and so on.

Another way that existing methods fall short is in the realm of live support. Upon release from an institution such as prison, an individual may lack the skills or knowledge needed to pursue a successful path toward rehabilitation or reintegration. Certain existing systems advocate the providing of resources to such an individual in electronic format, but no system offers constant access to a live support network with no cost to the participant.

SUMMARY

The technology disclosed herein can be used to implement machines, methods and articles of manufacture which can address one or more of deficiencies in the technology currently used in the art. For example, aspects of the disclosed technology can be used to implement a system comprising a computer, a first database, a second database, a first set of memory locations and a second set of memory locations. In such a system, the computer could be configured to collect location data from a plurality of portable electronic devices specified in a configuration file stored in the first database. The first database could contain personal data on a plurality of individuals, and each individual from the plurality of individuals could have a status of either under correctional supervision, previously under correctional supervision, or required to enter correctional supervision. The second database could contain location data collected by the computer for the individuals whose personal data is contained in the first database. The first set of memory locations could store a first set of software tools operable to configure the computer to, in response to receiving a request for data from an individual, filter data to be presented based on a role of the individual from whom the request is received. The second set of memory locations could store a second set of software tools operable to configure the computer to access and analyze personal data stored in the first database by matching that data against a set of information for one or more social service offerings available to a participant.

The disclosed technology could be used to implement methods as well. For example, aspects of the disclosed technology could be used to implement a method comprising creating a detailed program for a participant to follow, providing assistance to the participant to facilitate following the program, and monitoring the participant to verify that the program is being followed. In such a method, the detailed program could be created based upon at least one need of the participant, including all court ordered requirements. Providing the participant assistance to facilitate following the program could comprise using a data processor in a data processing center to match information regarding the participant with information regarding resources available to the participant. Monitoring the participant to verify that the program is being followed could comprise comparing location data provided by a portable device associated with the participant and a set of off-limits areas identified in the program.

Other methods are also possible. For example, using aspects of the disclosed technology, a method could be performed which comprises receiving a collection of location data from a portable device at a central location, storing the collection of location data in one or more back end databases, using data retrieved from the back end databases in determining if a participant is in a forbidden location of a competent court, using data retrieved from the back end databases in presenting location data, determining participant location based on comparing individual GPS data points with previous GPS data points, using the participant location in matching data related to the participant with data related to services that may benefit the participant, and using the participant location at a specific point in time and the data retrieved from the back end databases in verifying compliance by a participant with all relevant court orders and agreements is possible.

Other embodiments of the disclosed technology are also possible, will be immediately apparent to those of ordinary skill in the art, and could be made and used by those of ordinary skill in the art without undue experimentation in light of the disclosure set forth herein. Accordingly, the discussion of methods and systems which could be implemented using aspects of the disclosed technology should be understood as being illustrative only, and should not be treated as limiting on the protection accorded by this document or any related document.

BRIEF DESCRIPTION OF THE DRAWINGS

The drawings and detailed descriptions which follow are intended to be illustrative and are not intended to imply limitations on the scope of potential implementations of the disclosure set forth herein.

DETAILED DESCRIPTION

Figure 1:
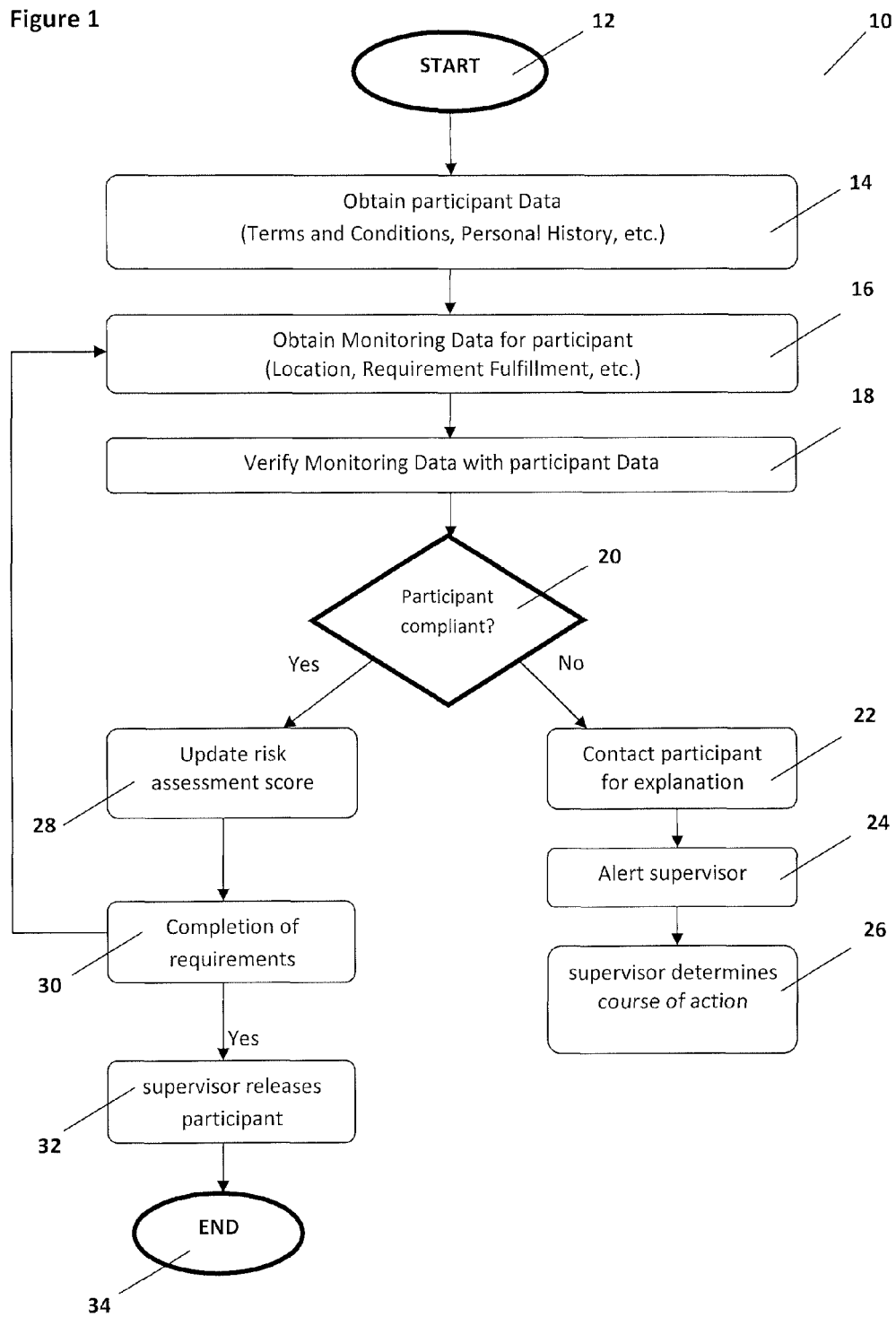
FIG. 1 depicts an exemplary generic high-level algorithm that can be used in the present invention.

Aspects of the technology disclosed herein can be used to implement a comprehensive, accessible system which can provide security for the public at large, aid for individuals participating in conditionally supervised release programs, and cost savings for the criminal justice system.

To minimize the threat posed by a person under corrections supervision, the disclosed technology can be used to implement a system which may include one or more of the following features: location tracking, voice authentication, and a 24-hour monitoring staff. A system such as might be implemented to include those features could operate in conjunction with a wireless communication device supplied to the participant. In a preferred embodiment, such a device has the functionality of (and may be) a cell phone or Smartphone, i.e. has cellular network, Internet and Global Positioning System (GPS) capabilities.

When using a portable device such as described, the participant will generally be made to understand that he or she is to carry the portable device at all times in order to correspond with the system, including call center staff (if provided), and as a reference for terms and conditions, including additional requirements entered into the system by the supervisor subsequent to release or sentencing.

A portable device can be implemented to interface with the system constantly, exchanging data related to aforementioned security mechanisms. In the system, a location-tracking unit can utilize GPS capabilities on the portable device, receiving position signals from satellites orbiting the Earth. The GPS capabilities of the portable device permit tracking of the participant with very high accuracy. A voice authentication mechanism can be used to verify that a participant has control and possession of his or her designated portable device at a variety of times. A 24-hour monitoring staff can be employed to monitor incoming data (e.g., voice authentication and location tracking) via the system platform.

As will be apparent to one of ordinary skill in the art, the inventor's technology can allow a portable device such as described above to eliminate the need for a body-worn transmitter. This can greatly increase a participant's freedom and ability to re-integrate into society while maintaining efficiency of monitoring and a high level of security. Additionally, in some embodiments, the participant could be free to use the portable device to call relatives, employers, friends, and so on. In such embodiments, these calls could be monitored so that calls of a suspicious nature can be investigated to ensure that no illegal activity is taking place.

The disclosed technology can be used to provide resources that can better equip a participant for successful completion of terms and conditions of sentence, and ultimately enable a successful, non-recidivist reintegration into society at large. To this end, a portable device can be used to provide the participant with instant access to a plurality of vital resources. These resources may include, but are not necessarily limited to: suitable job listings; important contacts and addresses; a satellite map with direction capabilities; a calendar and to-do list that shows upcoming requirements; and mail, messaging and call features to contact the 24-hour support staff for inquiries, notifications or emergencies. Access to these resources can be particularly helpful in the first few weeks following release from an institution such as prison.

In embodiments where they are provided, resources such as described above can be continually updated by the system or its implementers. Implementers of the system can include specialists that are hired to match participants with resources suited to their needs; specialists may also make assessments of mental, physical and emotional health conditions to determine if additional aid would benefit a participant.

In some embodiments, a system implemented using the technology disclosed herein can be programmed to generate aggregate data reports which can allow legislators and the like to make fast, informed decisions. The system can also allow for fewer incarcerated persons, which reduces costs to legislatures without compromising safety. Furthermore, the system can be used to replace costly current procedures with automated, streamlined services, and a 24-hour support staff operating as described can reduce the caseloads of supervisors, dramatically improving the public good.

Turning now to the figures, FIG. 1 shows a general algorithm [10] that can be used in embodiments of the present invention. The algorithm starts at block [12]. At block [14], the system obtains participant data (e.g., from a sentencing court), including, but not limited to, terms and conditions of sentencing, family and criminal history, behavioral patterns and so on. At block [16] the system obtains monitoring data regarding the participant, including but not limited to location of portable device, fulfillment of given requirements (for example, restitution payments) and so on. At block [18] the system compares these sets of data to verify compliance. At block [20] the system determines whether the participant is compliant; if not compliant, the system advances to block [22], where it contacts the participant directly to obtain an explanation. If no satisfactory explanation is given, the system alerts the supervisor at block [24], who then determines the necessary course of action at block [26]. If the participant is compliant, the system may update a score for the individual at block [28], where the score is an individualized report that reflects the risk a participant poses; with good behavior the participant receives a better score, which may result in a reduction in his or her program duration, while inappropriate behavior might extend program duration or demand greater security and less freedom. These scores are typically generated by a commercial, third party product such as LSI-R but may also be incorporated in the system. At block [30] the system determines if all requirements are satisfied; if not, the system returns to block [16] for further monitoring. If, and when, the supervisor determines that the participant is fit for release at block [32], then the system terminates at block [34].

Figure 2:
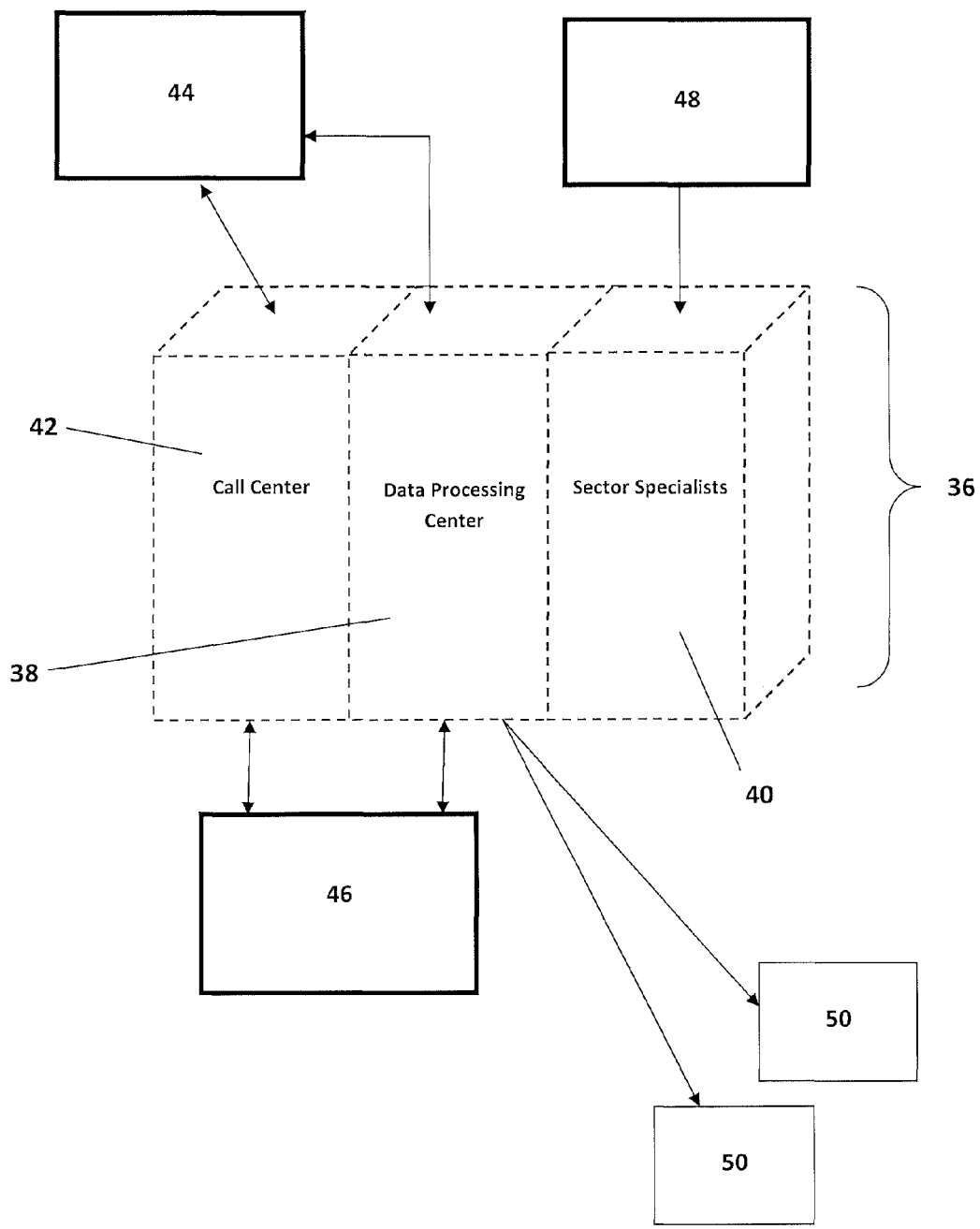
FIG. 2 depicts an exemplary generic high-level architectural scheme of channels of information and relationships that can be supported by the system.

In order to enable someone to connect with, and participate in, the channels of information and relationships supported, methods exist that connect individuals with resources. Exemplary channels of information and relationships supported by the system are illustrated in FIG. 2. In that figure, block [38] represents a data processing center which could be used in performing the activities of blocks [14][15] and [28] from FIG. 1; block [42] represents a call center, which can be used in performing the acts of blocks [18], [22], [24] from FIG. 1, and block [40] represents sector specialists who could potentially be incorporated in performing all of the steps illustrated in FIG. 1.

Turning now to the individual components shown in FIG. 2, as shown in that figure, the system provides a means to store data regarding third party services providers via block [38], thereby allowing the system to function by providing channels of information that match the participant to services offered. To accomplish the matching of information and resources to a person as shown in block [36] multiple components can be used in conjunction, including a data processing center [38], sector specialists [40], and one or more call centers [42]. A data processing center [38] is shown in detail in FIG. 3. As seen in FIG. 2, call center [42] can function as the main go-between for the supervisor [44] and the participant [46]. The sector specialist block [40] represents individuals hired to compare participant data with data from service providers [48]. Service providers [48] match participant [46] with service(s) and create individual programs based on these matches. Block [50], shown in multiples, represents multiple and varied data reports, which can be generated by the system and dispersed via a Web-access page.

These reports can be released depending on user access level, including but not limited to the following: legislators and executive branch members can view aggregate data reports on supervised populations; and management officials can view reports on supervisors, to ensure that duties are being performed satisfactorily at all levels of the system.

There are multiple reasons why a participant might interact with the call center [42], such as when a supervisor wishes to speak to a participant, or when a participant misses a court date and would like help rescheduling; other cases are court ordered calls into the call center [42]. When a participant contacts the call center [42], for example, via their portable device, all of his or her information appears on a web-access display page for the call center employee to view. This display page, called a "dashboard," can be configured to display all relevant information regarding the participant. This can include, but may not be limited to: personal information such as picture, address and name of supervisor; recent activity of the participant, with improper activity appearing at the top; current location and location history; terms and conditions of sentence; a calendar with upcoming requirements, and/or the participant's recent activity, including met or missed requirements (for example, a restitution payment).

Several tools, made available to users of the system via a web browser (such as Microsoft's Internet Explorer) can be provided to accomplish the matching of resources and participants. For example, after a supervisor logs into the system via a web page and enters his or her login credentials for verification, a supervisor calendar for the supervisor, and a participant calendar for each participant assigned to that supervisor, can be updated and synchronized. Synchronization can also occur at predefined intervals without the need for the supervisor or participant to log in. Other features, such as a template on which a staff member can type notes and send them directly to various parties can also be provided. Similarly, a system implemented according to this disclosure may include functionality to generate, on a regularly scheduled basis, a to-do list, which can list information that a call center employee could attempt to ascertain from a participant during a call, questions that could be asked may be regarding improper behavior (e.g. failure to contact supervisor when required), or reminders of other ongoing requirements. These questions (and their answers) can also be synchronized with the supervisor data either through a log in process or at regularly scheduled times.

Figure 3:
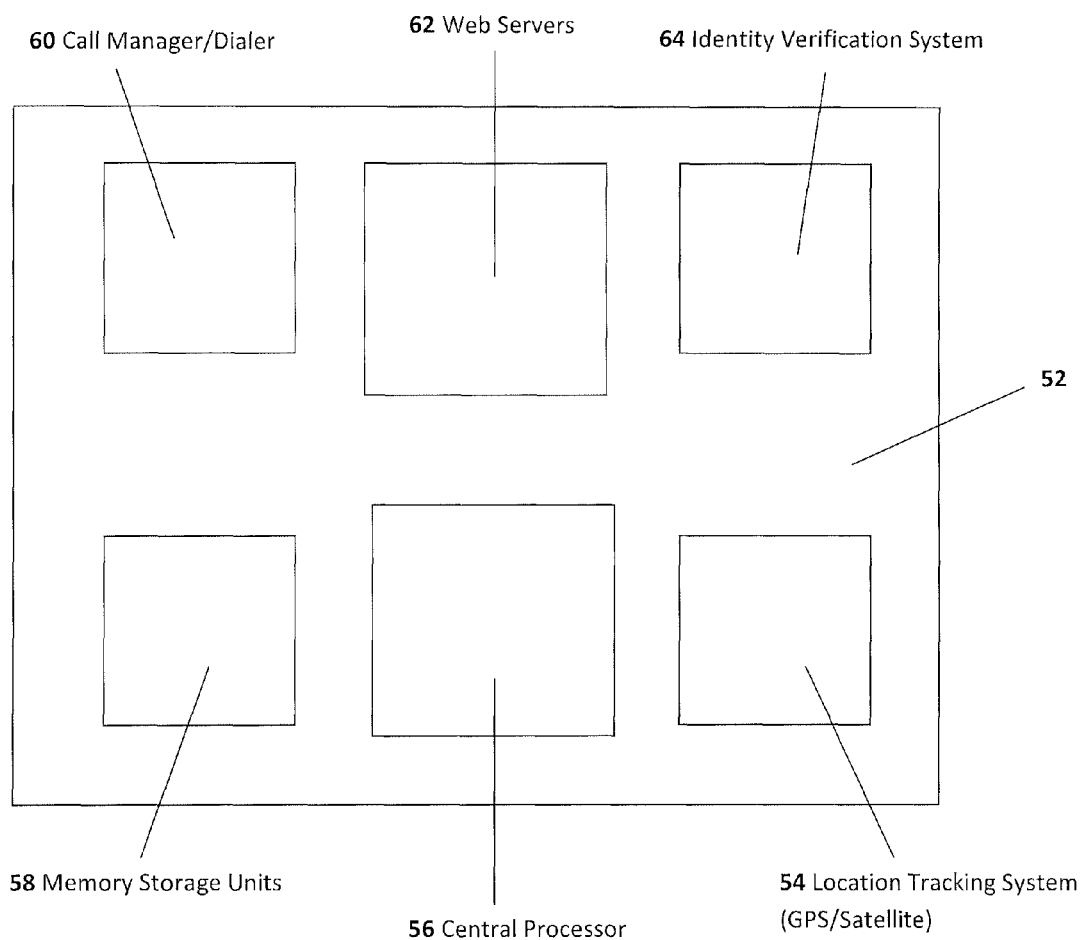
FIG. 3 depicts an exemplary generic high-level architectural scheme of a data processing center that can be used for a system repository.

Preferably, the system will operate using multiple, redundant, distributed data processing centers. FIG. 3 illustrates an example of one such data processing center. The data processing center [52] comprises subsystems [54]-[64], described as follows: block [54] represents a location-tracking unit, including satellite/GPS software, which tracks the location of the portable device. Additionally, in some implementations, this type of unit may be implemented to have a mechanism that automatically adjusts the mode of tracking based on the behavior of the portable device. For example, some systems implemented according to this disclosure might be configured to detect varying rates of movement. At lower speeds (for example, the speed of an average person walking) such a system could use time-based tracking methods, in which the system exchanges data with the portable device at intervals of time, for example every thirty seconds. At higher speeds, the system could use distance-based tracking, in which the system would exchange data with the portable device at intervals of distance, for example every two hundred feet that the device moves. Continually monitoring behavior patterns can allow a system implemented according to this disclosure to recognize and report discrepancies that might indicate non-compliance with terms and conditions.

Block [56] represents the central processor. Block [58] represents the memory storage unit for the overall system, which can be used to hold any and all data entered into the system, including but not limited to participant data as described above. Block [60] represents the call manager/dialer aspects of the system, which can operate through and for the call centers and handle both incoming and outgoing calls. Block [62] shows a system web server, which can be used to enable all web-based communication provided by the disclosed technology, including mail and browsing features on the portable device. A web server [62] can also facilitate the display of reports for various users; for example, a legislator or other affiliated party can view a customized, web-access "dashboard," described above. The final block [64] illustrated in FIG. 3 represents an identity verification system. This component can be configured to execute a plurality of procedures to verify that the participant is in possession and command of his or her portable device at all times. Such an identity verification system [64] can include a voice authentication mechanism, which operates as follows: the main system dials a portable device at random or designated intervals, or by manual dial, and requests that the participant recite a phrase or string of numbers. This phrase or string of numbers has been previously recorded in the participant's voice at the outset of the program. The voice authentication mechanism records a participant's response and compares it to the stored phrase or string in order to determine the identity of the possessor of the portable device. Additionally, the identity verification system [64] can be implemented to identify voice patterns in regular speech during any phone call. For example, if the participant calls from a device other than his or her portable device, the system can recognize the voice patterns and match them to participant data, thereby identifying the caller.

Figure 4:
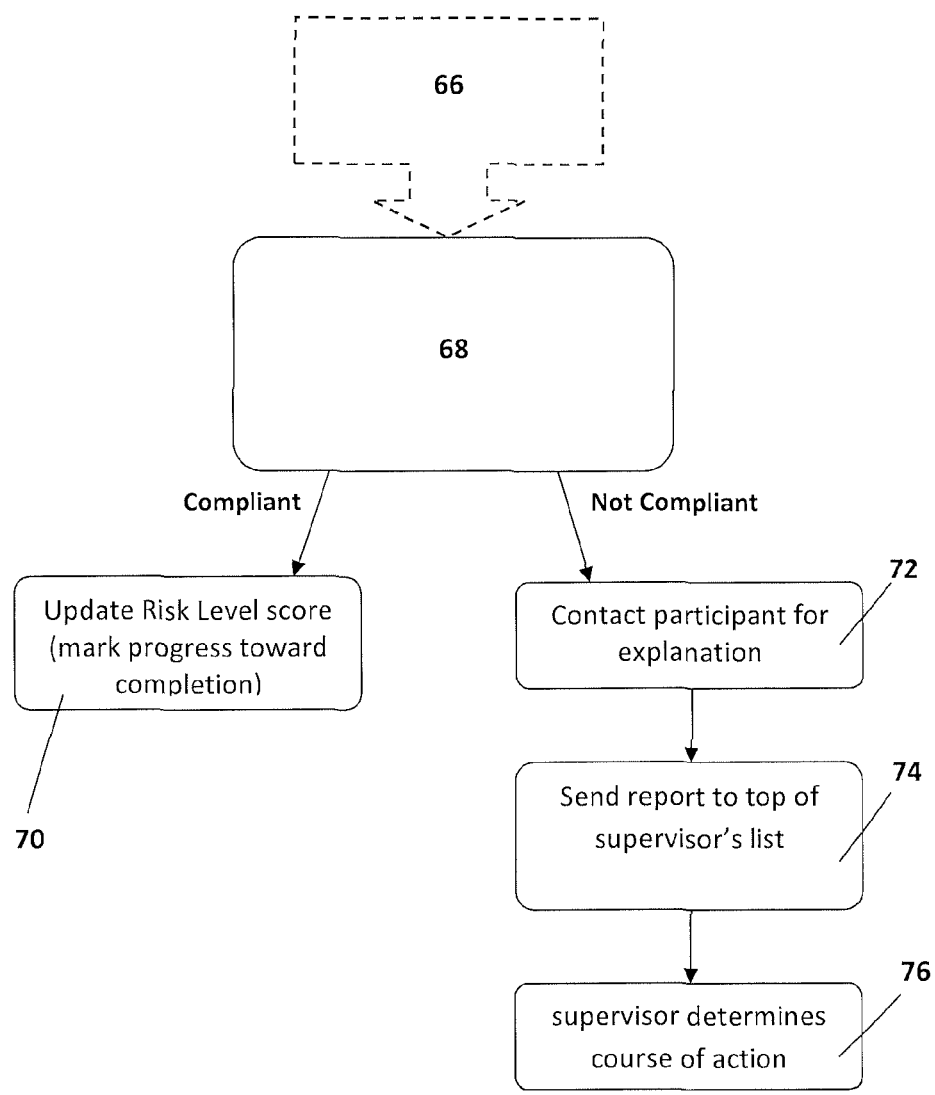
FIG. 4 illustrates a procedure that can be used for compliance verification.

FIG. 4 illustrates a procedure that can be used for compliance verification. In the procedure of FIG. 4, the system obtains participant monitoring data [66]. Data processor [68] then determines whether a participant is compliant or not compliant. This can be determined through a variety of criteria such as location monitoring. In addition to location monitoring, the system can use boundary-specific geofencing technology to maximize location-based security. Certain geographical areas can be demarcated off-limits for a given participant. For example, a former substance abuser might be banned from premises that sell controlled substances, or a former sex offender might be barred from school zones. A violation, or in some cases a near-violation, of these boundaries can result in an instant system alert, which could be designated a prohibited location alert. The alerts can be sent to three parties: the participant, the supervisor, and the call center so that every user of the system is informed in real-time of location-based security risks. Other alerts might include required attendance alerts (notifications of mandatory upcoming events), curfew alerts, and missed appointment alerts (e.g., absence from a required substance abuse meeting).

If, during the process of interaction with the supervisor or the call center as described herein, a participant is found compliant with the terms and conditions set forth in the his or her participant profile, the system proceeds to mark progress toward completion of program and updates the participant's risk score [70]. If the participant is not compliant, the system can be configured to contact the participant for an explanation [72] and to send a report to the top of the supervisor's list [74]. The supervisor can then determine the next course of action [76] and that adds sufficient data into the system to update the status of the participant.

Figure 5:
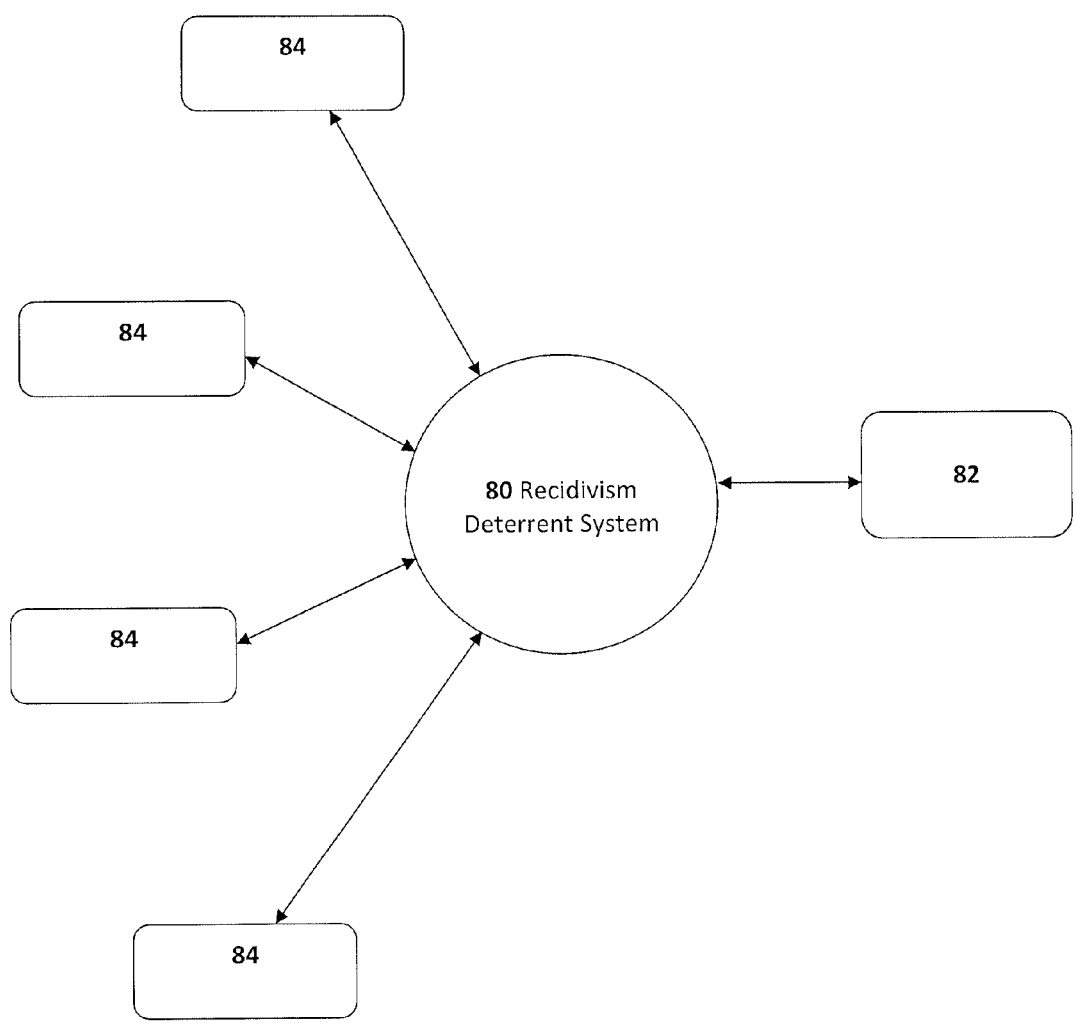
FIG. 5 depicts an exemplary generic high-level architectural scheme for a social networking mechanism that operates over a Web server.

FIG. 5 illustrates a social networking mechanism which can operate over a web server used to deploy a system using the disclosed technology, and which can serve to deter recidivism in a participant. This social network [80] (referred to as a "Recidivism Deterrent System" in FIG. 5) enables instant, bi-directional communication between the participant [82] and the sector specialists [84], as described in FIG. 2. Block [84], shown in multiples, represents a variety of sector specialist areas, including but not limited to: job opportunities, education and training, substance abuse counseling, medical conditions, and so on. Each block [84] might represent a sector specialist of a specific area. The social network [80], by analyzing data regarding a participant and the resources and services available that are stored in the central repository, links sector specialists [84] with the participant [82]. Moreover, the social network [80] can be implemented to initiate this procedure proactively: in the crucial period following release or sentencing, the social network [80] can be configured to continually match and connect participants with third party services providers while enabling and promoting direct communication between the them, for example, by sending a participant mail message to the participant describing the action or result that a participant should take based upon the results of the method of FIG. 4, and also by sending a supervisor mail message to the supervisor indicating the same.

The inventor's technology can also be used to provide other types of support and/or information. For example, the inventor's technology could be used in systems in which a first portable electronic device is provided to a participant under conditionally supervised, and a second portable electronic device is provided to an individual who needs protection from the participant. In this type of system, GPS or other type of location data from both devices can be sent to a data processing center as described, and the relationship between the locations of the two devices can be used to determine and provide useful information to the individual in need of protection. For instance, if information stored in a database at a data processing center indicated that a condition of the participant's release is that he or she remain more than 1000 feet away from the individual in need of protection, and the location data indicated that the participant had moved to within 1000 feet of the individual in need of protection, the data processing center could send a signal to the electronic device of the individual needing protection which could allow him or her to take appropriate action to avoid harm. To facilitate this, the electronic device for the individual needing protection could be configured with mapping software that, upon receipt of a notification from the data center, would display a map showing the relative locations of the participant and the individual in need of protection.

Variations on the above are also possible. For example, rather than (or in addition to) simply providing location information, other potentially useful information could be provided. For instance, the data processing center could be configured to provide movement data regarding the participant, and a map application on the electronic device of the individual needing protection could be configured to show vectors indicating the direction and speed of the participant, which information could allow the individual needing protection to avoid crossing the participant's path. Similarly, rather than (or in addition to) simply triggering a notification when a condition of the participant's conditionally supervised release is violated, the data processing center could be configured to detect when a violation appeared likely, and could trigger a notification in advance of the violation actually taking place. For instance, the data processing center could use changes in a participant's location information, and changes in the location information for the individual needing protection to detect that the two would come within a certain distance of each other if they continue their current activities. An alert could then be sent to the device of the individual requiring protection notifying him or her of the event even before a violation of the participant's terms of release (e.g., if the participant was prohibited from being within 500 feet of the individual requiring protection, the data center could detect and send an alert if the participant would come within 500 feet within a threshold time period if he/she continued to follow his/her current path at his/her current speed).

Further variations on events that would trigger a notification are also possible. For instance, notifications independent of a violation of release conditions could also be sent based static position, rather than movement. For example, it is possible that the inventor's technology could be used to implement a system which would detect whenever a participant came within a set distance (e.g., 500 feet) of an individual requiring protection, and would send a notification to the individual requiring protection when the participant came closer than that distance, regardless of whether that distance was required by the terms of the participant's conditional release.

As another example of variations on events that could trigger notifications, it is possible that notifications could be triggered based on proximity of a member of a class of participants to an individual needing protection, rather than being triggered based on proximity of an individual participant and an individual needing protection. To illustrate, consider the case of an elementary school teacher. While this teacher may not be under threat from any particular participant, the teacher (and, more directly, the students under the teacher's care) may require protection from participants identified as child sex offenders. To address this, a data processing center could be configured to store information identifying participants who have been classified as child sex offenders, and to send a notification to the teacher when the child sex offender is detected within a given proximity. In some cases, this type of notification could be keyed to more than just location. For example, if a child sex offender is detected within a certain proximity of a teacher outside of school hours, then a different (or no) notification could be sent relative to the notification that could be sent if the teacher was more likely to be in the company of children.

Variations are also possible with respect to the nature of notifications that could be sent. For example, in some cases, a portable device provided to an individual requiring protection could be configured to provide an audible alert when a notification is received (e.g., it could be a Smartphone which would ring when a notification is received). However, depending on why the individual needing protection needs protection, such an audible alert may be undesirable, as it might preclude the individual needing protection from protecting himself or herself by concealing his or her location from the participant (i.e., by hiding). To account for this fact, in some situations, a device provided to an individual needing protection could be configured to provide alerts that would be perceived only by the individual requiring protection (e.g., to vibrate). Alternatively (or additionally), the inventor's technology could be implemented to provide multiple notifications to minimize the possibility that an initial notification is not received. For example, an individual requiring protection could be given an initial notification via vibration of an electronic device, and, unless he or she provides an acknowledgement signal (e.g., actuation of a button, or reply to a notification text), the initial call could be followed by a call from personnel at a call center. Other types of multiple notifications (e.g., increasing volume of a ring, flashing lights, etc) are also possible, and could be implemented by those of ordinary skill in the art without undue experimentation in light of this disclosure.

Of course, while the above examples focused specifically on notifications provided to an individual needing protection, that type of notification could be supplemented (or supplanted) by other types of notifications. For example, notifications as described above could be sent to a participant, his or her supervisor, call center personnel, or others. Similarly, it is possible that notifications provided to different individuals could be triggered by different events. For example, it is possible that a participant could be sent a notification that an individual the participant was restricted from approaching was within 1000 yards, while the individual the participant was restricted from approaching might be given the same type of notification when the participant was within 500 yards. In this way, the individual requiring protection could avoid receiving an unduly large number of notifications (which could have a desensitizing effect), while the participant could be given a notification which would allow him or her to avoid inadvertently violating the conditions of his or her release without waiting until he or she was close enough to be able to use the notifications to locate the individual who requires protection.

Preferably, and in most cases, this type of notification to a participant, which would be triggered at least in part based on information about an individual not under the jurisdiction of the criminal justice system (e.g., an individual requiring protection) will be provided only if the individual not under the jurisdiction of the criminal justice system has opted in. However, there are some situations where restricting notifications to cases where there has been an opt-in may not be feasible (e.g., a teacher may be required to consent to proximity notifications being sent to participants during work hours as part of the teacher's job). The specific types of notifications, triggering events and conditions will vary from case to case, and so the notification examples set forth above, like the other examples in this application, should be understood as illustrative only, and should not be treated as limiting on the scope of protection afforded by this document or any related document.

While the above disclosure discussed and explained certain manners in which the inventor's technology can be used, it should be understood that the inventor's technology is not limited to being implemented in the manners explicitly described. Accordingly, instead of limiting the protection accorded by this document (or any related document) to the material explicitly disclosed herein, the protection should be understood to be defined by the claims when the terms in the claims which are listed under the heading "Explicit Definitions" are given the explicit definitions set forth herein, and all other terms are given their broadest reasonable interpretation as shown by a general purpose dictionary. To the extent that the interpretation which would be given to the claims based on the above disclosure or the incorporated priority documents is in any way narrower than the interpretation which would be given based on the "Explicit Definitions" and the broadest reasonable interpretation provided by a general purpose dictionary, the "Explicit Definitions" and the broadest reasonable interpretation provide by a general purpose dictionary shall control.

EXPLICIT DEFINITIONS

When used in the claims, the phrase "GPS data", or "location data", should be understood to refer to an identifiable unit of information received from a Global Position System satellite orbiting the Earth.

When used in the claims, the phrase "inbound transmission" should be understood to mean that destination of the data being sent from an electronic portable device is the data processing center.

When used in the claims, the phrase "outbound transmission" should be understood to mean that destination of the data being sent from the data processing center is an electronic portable device.

When used in the claims, the term "participant", should be understood to mean a conditionally supervised individual who is currently, or was previously, a user of the system who was, or is currently, under the jurisdiction of a competent court.

When used in the claims, the term "supervisor" should be understood to mean an individual who is currently, or was previously, a user of the system that supervises a participant under the jurisdiction of a competent court.

When used in the claims, the phrase "sector specialist" should be understood to mean individuals who provide services to participants with the goal of helping them to assist the participant in their successful reentry into society at large.

When used in the claims, the term "profile" should be understood to mean a collection of data that is specific and personal to an individual.

When used in the claims, the phrase "real time", or "real-time" should be understood to refer to nearly simultaneous in an absolute, physical sense and apparently simultaneously in a perceptual sense.

When used in the claims, the term "provide," or "provides," or "providing" should be understood to mean (i) to take precautionary measures, or (ii) to make a proviso or stipulation, or (iii) to make preparation to meet a need, or (iv) to prepare in advance, or (v) to supply or make available, or (vi) to make something available to, of (vii) to have as a condition.

When used in the claims, the phrases "electronic mobile device", or "mobile device" should be understood to refer to any type of device comprising any type of electronic circuitry and uses a power supply that can easily, and reasonably, moved around, such as a laptop computer, and can receive and transmit GPS data.

Accordingly,

I claim:

1. A system comprising:
   a) a computer configured to collect location data from a plurality of portable electronic devices specified in a configuration file stored in a first database;
   b) the first database containing personal data on a plurality of individuals, wherein each individual from the plurality of individuals has a status taken from the set of statuses consisting of:
      i) under correctional supervision;
      ii) previously under correctional supervision; and
      iii) required to enter correctional supervision;
   c) a second database containing location data, collected by the computer, for the individuals whose personal data is contained in the first database;
   d) a first set of memory locations storing a first set of software tools operable to configure the computer to, in response to receiving a request for data from an individual, filter data to be presented based upon a role of the individual from whom the request is received;
   e) a second set of memory locations storing a second set of software tools operable to configure the computer to access and analyze personal data stored in the first database by matching personal data stored in the first database against a set of information for one or more social service offerings available to a participant, wherein the one or more social service offerings available to the participant comprise employment assistance, housing assistance, and mental health assistance;
   wherein:
   A) the plurality of portable electronic devices comprises a set of mobile phones designated for individuals from the plurality of individuals;
   B) the system comprises a processor configured to verify that mobile phones from the set of mobile phones are in possession of the designated individuals from the plurality of individuals;
   C) the second set of memory locations storing the second set of software tools is comprised by a server configured to:
      I) analyze the personal data stored in the first database by matching it against information for one or more social service offerings by comparing personal data stored in the first database against a plurality of sector specialist areas; and
      II) operate a social network configured to proactively send linking messages establishing links between:
         i) sector specialists corresponding to sector specialist areas matched against personal data stored in the first database; and
         ii) individuals from the plurality of individuals whose personal data was matched against the sector specialist areas;
   D) the social network is configured to proactively send the linking messages to:
      I) the individuals from the plurality of individuals whose personal data was matched against the sector specialist areas; and
      II) supervisors for the individuals from the plurality of individuals whose personal data was matched against the sector specialist areas;
   E) the computer is configured to, for each individual from the plurality of individuals:
      I) verify compliance by that individual with a program specific to that individual by comparing location data from a portable electronic device designated for that individual with a set of off-limits areas identified in the program specific to that individual; and
      II) update a risk score for that individual based on compliance by that individual with the program specific to that individual.

2. The system of claim 1 wherein the one or more social service offerings available to the participant comprise at least a plurality of social service offerings, the plurality of social service offerings comprising each of employment assistance, housing assistance, and mental health assistance.

3. The system of claim 1 wherein the first database and the second database are stored in a central repository.

4. The system of claim 3 wherein the plurality of portable electronic devices are configured for transmitting data stored on each of the portable electronic devices to the central repository from a remote location.

5. A system comprising:
   a) a set of mobile phones, each of which is designated for an individual from a plurality of individuals, wherein each individual from the plurality of individuals has a status taken from the set of statutes consisting of:
      i) under correctional supervision;
      ii) previously under correctional supervision; and
      iii) required to enter correctional supervision;
   b) a computer configured to, for each individual from the plurality of individuals:
      i) verify compliance by that individual with a program specific to that individual by comparing location data from the mobile phone designated for that individual with a set of off-limits areas identified in the program specific to that individual; and
      ii) update a risk score for that individual based on compliance by that individual with the program specific to that individual;
   c) a processor configured to verify that mobile phones from the set of mobile phones are in possession of the designated individuals from the plurality of individuals;
   d) a database storing personal data on each individual from the plurality of individuals;
   e) a server configured to
      i) analyze the personal data stored in the database by matching it against information for a plurality of social service offerings comprising employment assistance, housing assistance, and mental health assistance by comparing personal data stored in the database against a plurality of sector specialist areas; and
      ii) operate a social network configured to proactively send linking messages establishing links between:
         a) sector specialists corresponding to sector specialist areas matched against personal data stored in the first database; and
         b) individuals from the plurality of individuals whose personal data was matched against the sector specialist areas;
      wherein the social network is configured to proactively send the linking messages to:
         A) the individuals from the plurality of individuals whose personal data was matched against the sector specialist areas; and
         B) supervisors for the individuals from the plurality of individuals whose personal data was matched against the sector specialist areas.

* * * * *